Figure 2A:
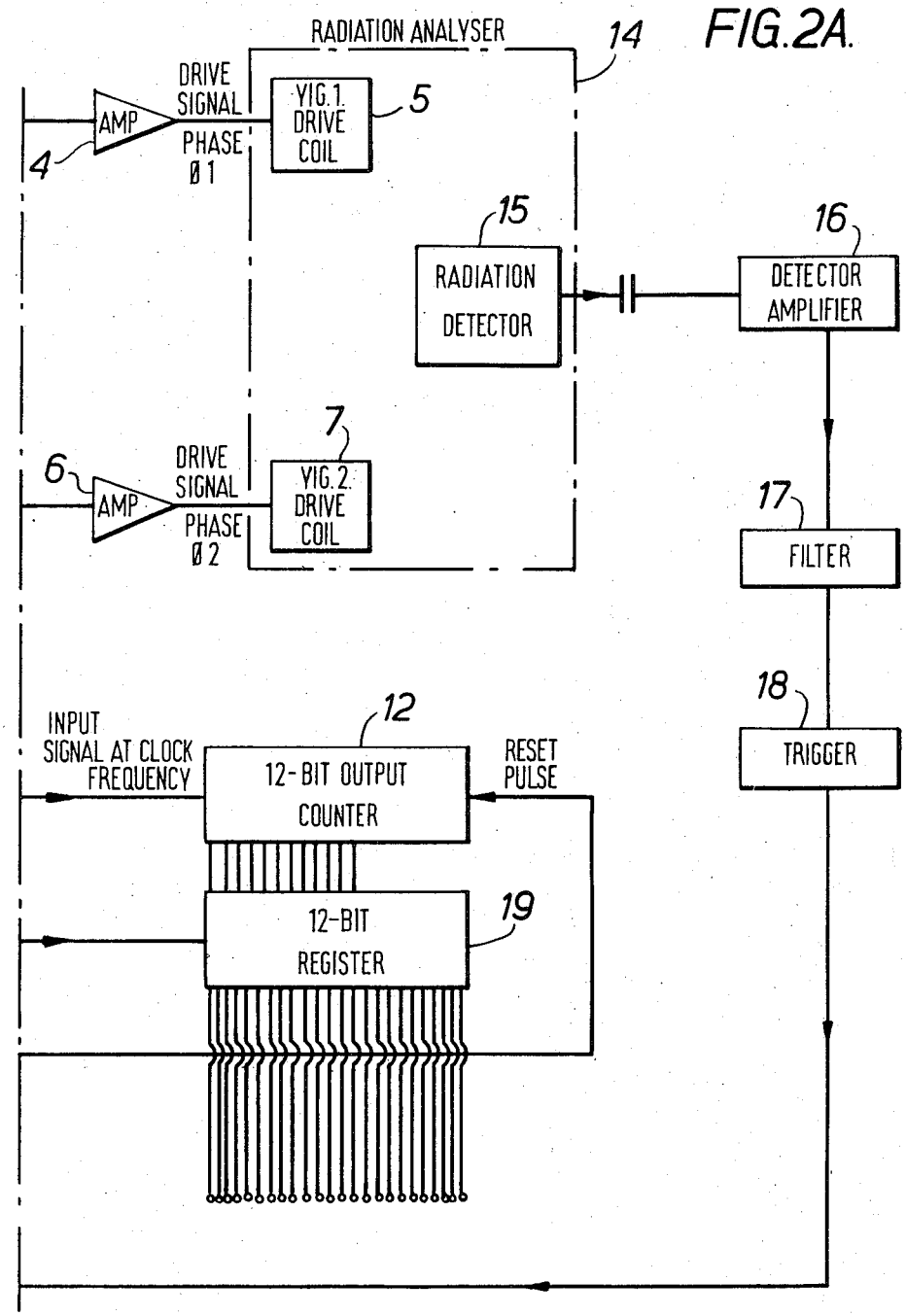

United States Patent

Emery et al.

[11] 3,861,805
[45] Jan. 21, 1975

[54] RADIATION ANALYZERS

[75] Inventors: Anthony George Montague Emery, Kent; Charles Walter Munday; David Roland Weaver, both of Surrey, all of England

[73] Assignee: BP Chemicals Limited, London, England

[22] Filed: July 20, 1973

[21] Appl. No.: 381,271

Related U.S. Application Data

[63] Continuation-in-part of Ser. No. 192,819, Oct. 27, 1971, abandoned.

[30] Foreign Application Priority Data
Oct. 29, 1974   Great Britain..................... 51394/74

[52] U.S. Cl.................. 356/116, 250/225, 350/150
[51] Int. Cl. .......................................... G01n 21/40
[58] Field of Search ............ 350/150, 160; 356/116, 356/117; 250/225

[56] References Cited
UNITED STATES PATENTS
3,446,966   5/1969   Peterson ...................... 350/150 UX
3,659,111   4/1972   Weaver et al................... 250/225 X
3,675,125   7/1972   Jaecklin ...................... 350/150 UX

*Primary Examiner*—John K. Corbin
*Attorney, Agent, or Firm*—Brooks Haidt & Haffner

[57]  ABSTRACT

Method of analysis using a twin beam radiation analyzer in which the incident beams of radiation are modulated by a lithium niobate crystal chopper operating at a temperature of less than 50°C, activated by two, square wave form alternating voltages to give two out of phase incident beams of radiation which are passed through two sample cells, collected in a single detector, the resulting signal being resolved to give the fundamental alternating current wave form, the phase shift of which determined automatically and is related to the differences in absorption of the contents of the two sample cells.

4 Claims, 7 Drawing Figures

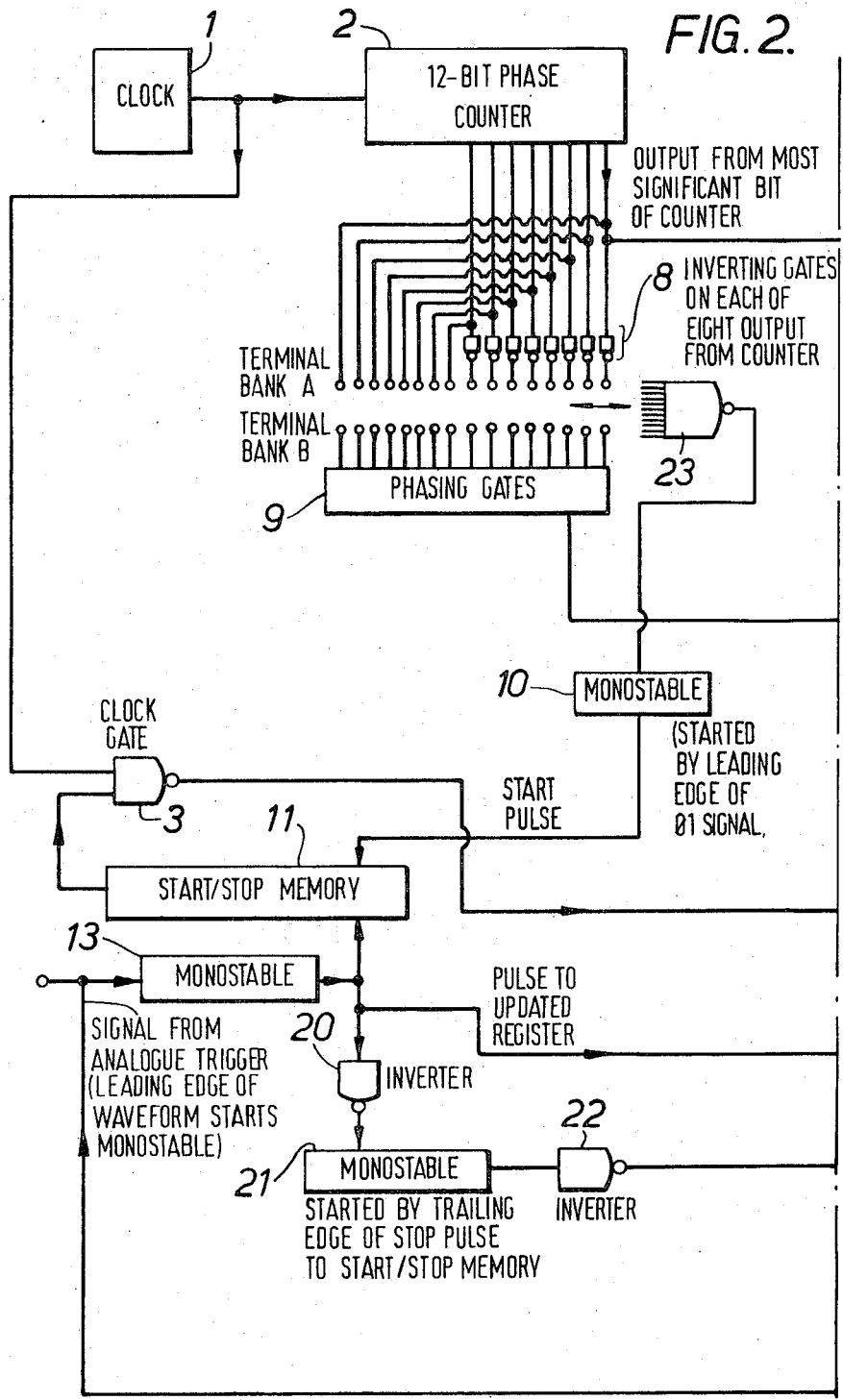

RADIATION ANALYZERS

This application is a continuation-in-part of our co-pending application Ser. No. 192,819, filed Oct. 27, 1971 and now abandoned.

The present invention relates to radiation fluid analyzers and in particular means for sequentially chopping two beams of radiation in a radiation fluid analyzer.

Radiation fluid analyzers of the type having a source of radiation split into two separate beams, at least one beam passing through the cell containing the fluid to be analyzed, means for sequentially chopping said beams, a detector system to which the beams are sequentially presented and means for amplifying each of the signals and measuring the ratio of one to the other, are known and have been described in British Pat. No. 899,973.

However, the previously known analyzers have the disadvantage that the means hitherto employed for sequentially chopping the beams of radiation have been of a mechanical nature for example, a rotating perforated disc, belt or cylinder. These mechanical devices have the disadvantage that they are inherently unreliable and require maintenance, and to overcome these disadvantages it has been proposed to construct a radiation fluid analyzer having means for sequentially chopping the beams of radiation comprising in each beam, means for polarizing the beam of radiation, an electro or magneto optic crystal, said crystal when energised being capable of transmitting and rotating the plane of polarized radiation, a further polarizing agent located after said crystal in the beam of radiation and means of modulating the energising current or voltage of each crystal.

The principle relied on for the operation of the radiation choppers in the above type of analyzer is the Faraday effect for magneto optic crystals and the effect in electro optic crystals in which the plane of polarization of transmitted radiation is rotated by an applied electric field. Such a system gives adequate modulation of the radiation for most practical purposes. For example, with an yttrium iron garnet magneto-optic crystal it is possible to obtain 20 to 40 percent modulation of infrared radiation and this degree of modulation is sufficient to enable satisfactory measurements to be made.

It is also known that lithium niobate, when operated at a temperature of at least 50°C, exhibits a significant electro-optic effect of device capability. See for example U.S. Pat. No. 3,446,966.

However, in the past, it has been considered by those skilled in the art that when a lithium niobate crystal is at temperatures below 50°C, the amount of modulation of radiation which can be obtained is too small to be of practical use in a twin beam radiation fluid analyzer. It is, of course, disadvantageous to have to maintain the lithium niobate crystals at 50°C and higher.

We have discovered that the reason why the use of a lithium niobate crystal as a radiation beam modulator at temperatures 50°C has been considered impractical, is that the methods and apparatus for detecting and measuring the modulated beams which have been used have been unable to satisfactorily detect and measure the modulated beams. We have futher discovered that if detecting and measuring apparatus of the type disclosed in U.S. Pat. No. 3,659,111 in the name of Michael Henry Spearing and two of the inventors named in this application, is used in association with twin beam radiation fluid analyzer apparatus employing modulated lithium niobate crystals, highly satisfactory results can be obtained even when the crystals are operated at a temperature below 50°C. Accordingly, by reason of the use of such detecting and measuring apparatus, it becomes possible, for the first time, to provide a practical twin beam analyzer using lithium niobate crystals operating at temperatures below 50°C as the radiation modulators.

It is an object of the present invention to provide a twinbeam radiation fluid analyzer which will give a satisfactory degree results when two beams of radiation are modulated using a pair of lithium niobate crystals, activated by applied electric fields and operated at a temperature below 50°C.

Accordingly the present invention is a method for analysis using a twin-beam radiation analyzer which comprises modulating the two incident beams of radiation by means of a radiation chopper comprising, in combination in each beam, polarizing means and a lithium niobate crystal at a temperature below 50°C, each crystal being activated by one of two, out of phase, square wave form alternating voltages to give two, out of phase, incident beams of radiation, passing at least one beam through a sample cell, presenting the resultant radiation to a detector, extracting the fundamental alternating wave form signal from the complex square wave form signal from the detector and automatically measuring the phase shift of the fundamental alternating wave form signal by triggering a counter with one of the two square wave form voltages used to activate the radiation chopper or a pulse bearing some fixed phase relationship with said voltages and stopping the counter by means of the fundamental alternating wave form signal converted to a square wave form.

In an alternative method using a counter, the latter can be started by a trigger signal derived from the complex square wave form signal from the detector.

It may be seen that any phase change in the fundamental alternating wave form signal will allow the counter to run for a longer period of time before cut-off occurs, and therefore the counter reading is related to the ratio of the absorption of radiation in the two beams.

Lithium niobate is a crystal which will transmit plane-polarized radiation along the direction of the optic axis and which will, when subjected to an energising voltage applied at a suitable angle to the optic axis, split the transmitted plane polarized radiation into two separate components, namely an ordinary ray and an extraordinary ray. The ordinary ray is transmitted in the original direction with no rotation of its plane of polarization or phase change and the extraordinary ray is transmitted in a diverging direction, with a rotation of its plane of polarization and a phase change of 90° relative to the ordinary ray.

The plane of polarization and the magnitude of the resultant transmitted radiation from the excited lithium niobate crystal can be found by vector addition of the ordinary and extraordinary rays as they emerge from the crystal. As the phase change of the extraordinary ray is related to (1) the dimensions of the crystal, (2) the direction of transmission of the rays relative to the crystallographic axes, (3) the wavelength of the transmitted radiation and (4) the magnitude of the applied electric field, it may be seen that as in any given set of circumstances, 1,2 and 3 are substantially constant, then the phase change is proportional to the applied electric field.

However, in practice, it is not desirable to apply sufficient voltage to obtain a 100 percent phase shift because of excess heat build up in the crystal. It is therefore preferred to use a lower applied voltage, giving less than a 180° phase shift of the extraordinary ray and an operating temperature of below 50°C. Lithium niobate is capable of giving a modulation of 60 to 70 percent when subjected to an applied field at right angles to its optic axis.

The crystals are suitably placed between a pair of polarizing filters constructed of a suitable dichroic material or preferably the radiation can be polarized by reflection at the Brewster angle from a suitable plane surface or by use of a grid polarization filter. The combination of polarizing filters and crystals acts as a chopper.

The present invention is, further, apparatus for analysis which comprises in combination a square wave form alternating current or voltage generator supplying a square wave form alternating voltage to a counter divider arranged to divide said square wave form alternating voltage into two, out of phase, square wave form alternating voltages, two amplifiers, each being arranged to amplify one of said out of phase voltages, a twin beam radiation analyzer, said radiation analyzer having a radiation chopper comprising in combination in each beam, polarizing means and a lithium niobate crystal, each crystal being arranged to be activated by one of said two out of phase, square wave form alternating voltages applied at an angle to its optic axis and means for detecting the complex resultant square wave form radiation, means for amplifying the complex alternating signal from said detector a filter capable of extracting the fundamental alternating wave form signal from the complex signal from the detector, and a squaring amplifier to convert the extracted signal into a square wave form, wherein one of the two out of phase square wave form alternating currents or voltages from the counter divider is arranged to start a counter and the extracted signal in square wave form is arranged to stop said counter.

The invention will now be described with reference to a twin beam radiation fluid analyzer.

Figure 1A:
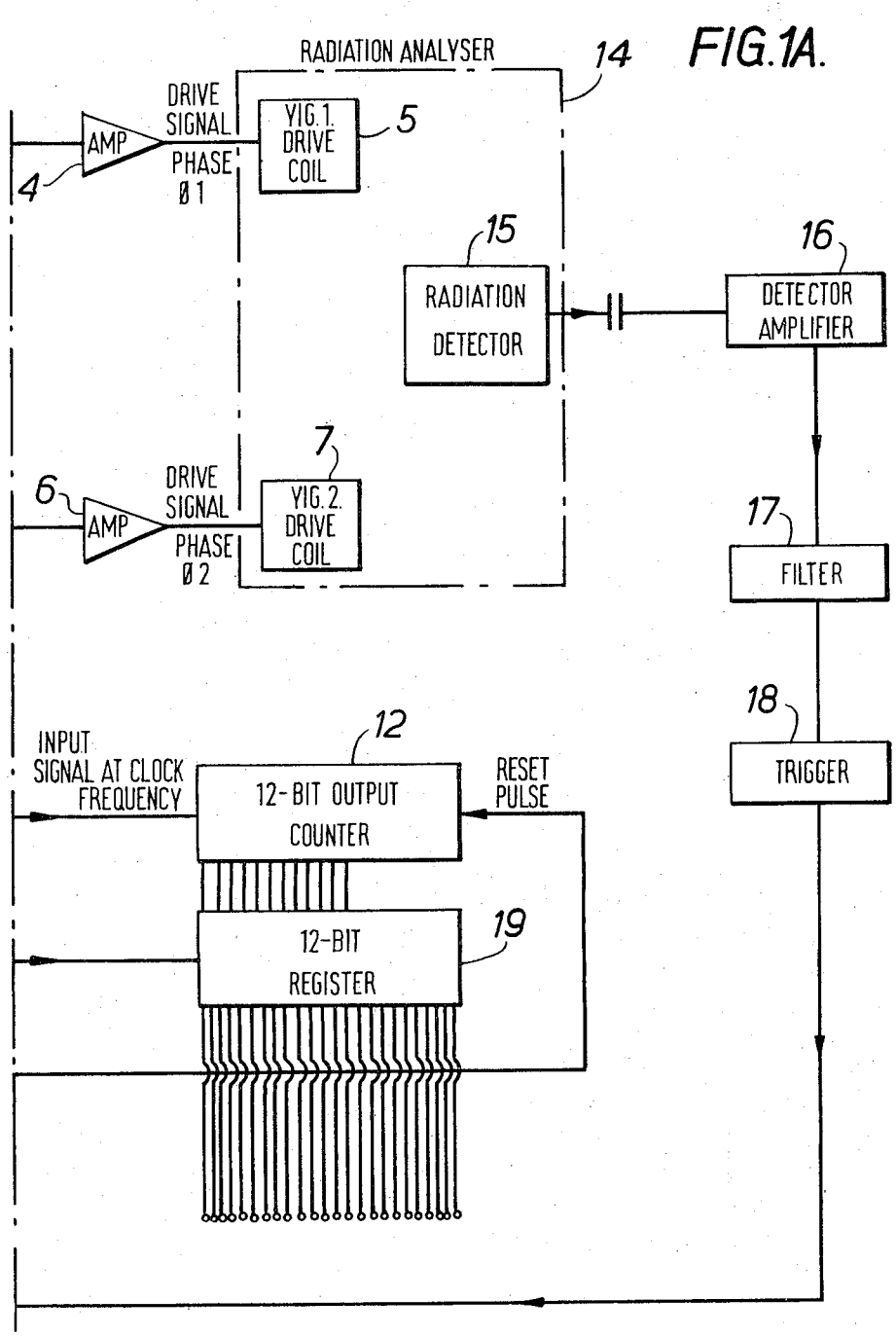
Figure 1:
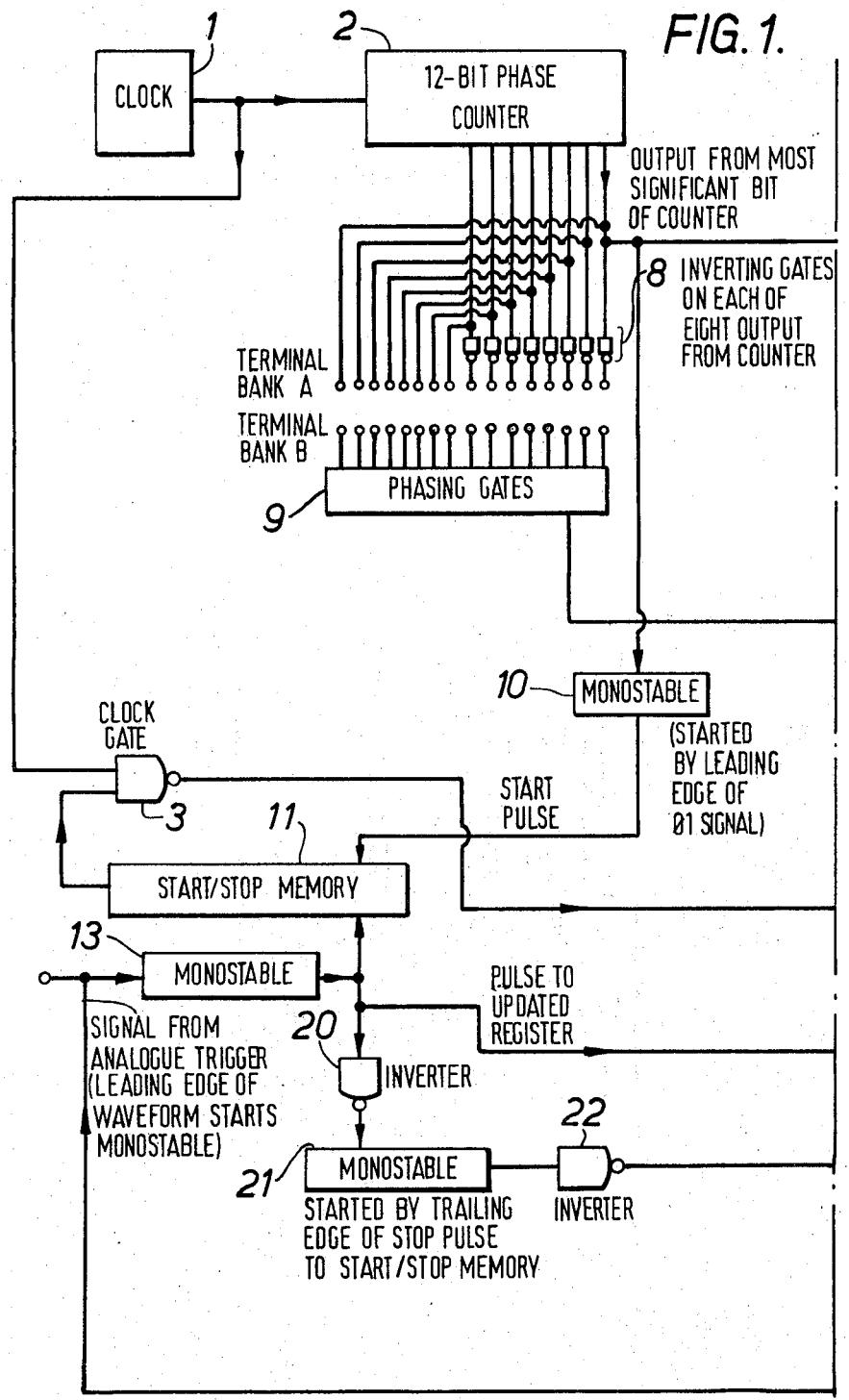

FIGS. 1 and 1A are a diagrammatic representation of such an instrument, omitting details of the optical system and should be viewed side-by-side with FIG. 1A to the right.

Figure 3A:
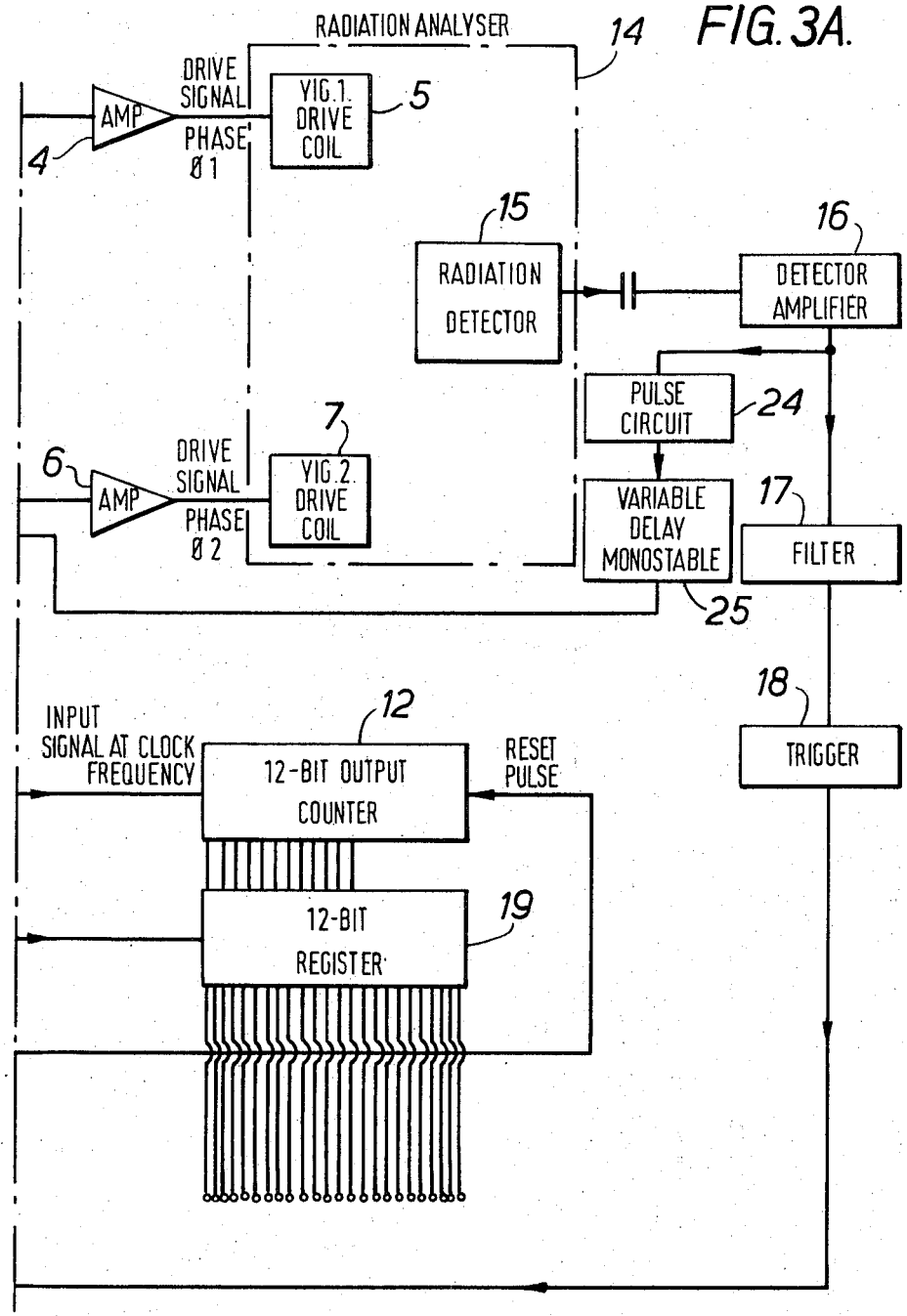
Figure 3:
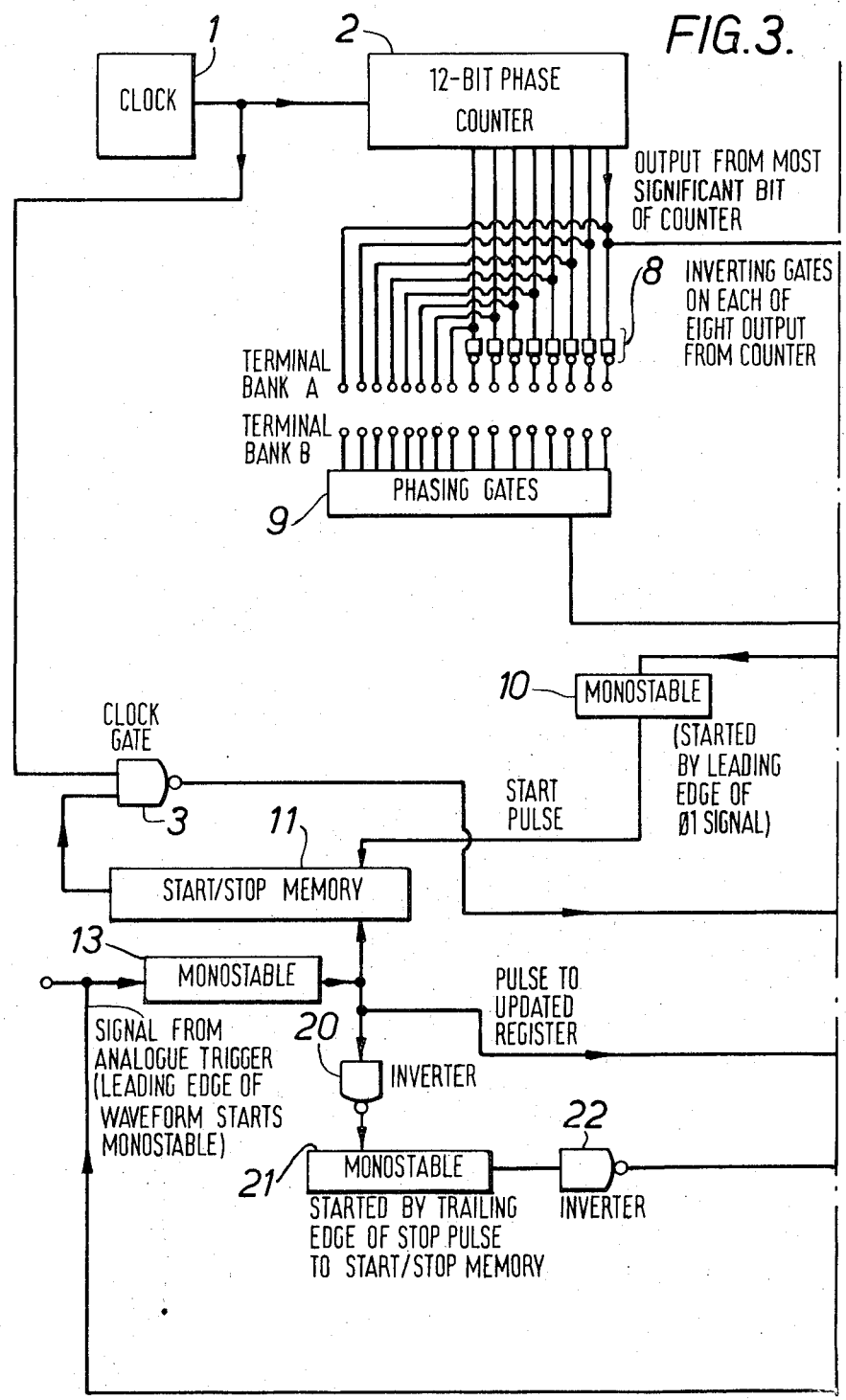
Figure 4:
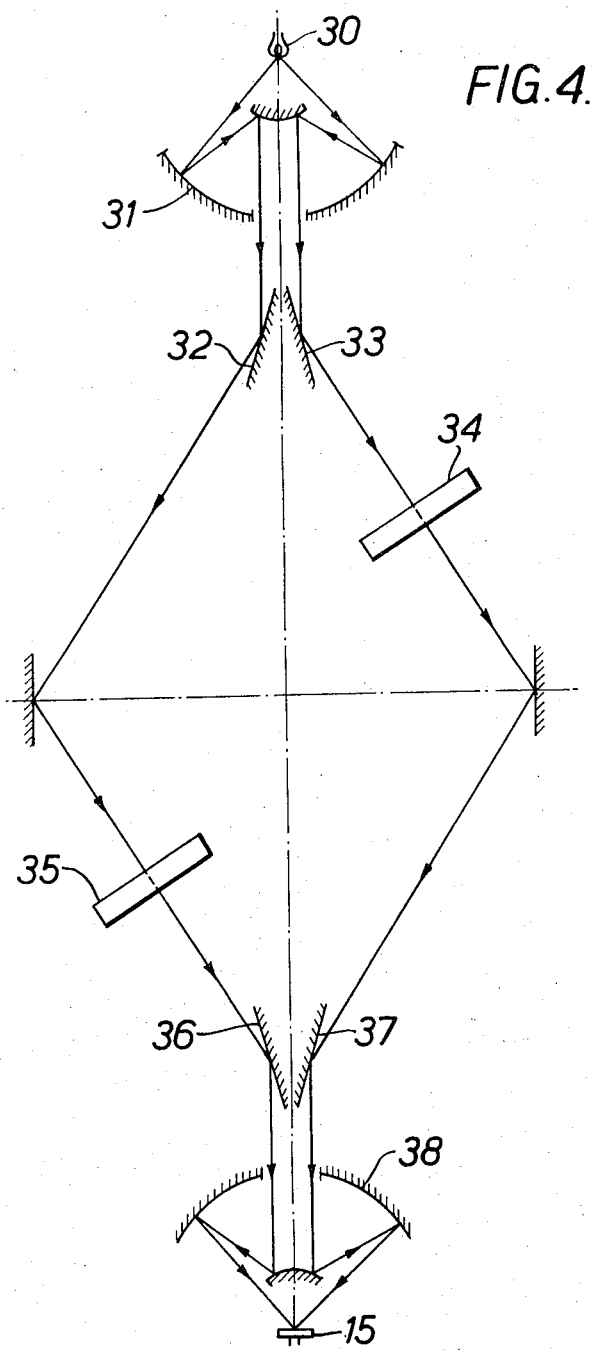

FIGS. 2, 2A, and 3, 3A are Figures similar to FIGS. 1 and 1A which show modifications of the instrument, again with the optical system omitted, and FIG. 4 is a layout of a suitable optical system for use when the instrument is a twin beam infra red liquid analyzer working in the overtone region of the infra red.

Referring to FIG. 1 a clock pulse generator 1 producing pulses at a repetition rate of about 4 million pulses per second supplies signals to the 12-bit phase counter 2 and to the clock gate 3. The phase counter divides the frequency of the clock pulses so that the most significant bit of the counter changes from the binary '0'state to the binary '1'state at the rate of $f$ where;

$f =$ (clock pulse repetition/$(2)^{12}$) = (clock pulse repetition rate/4096)

Thus if the clock repetition rate is exactly 4.096 million pulses per second the most significant bit of the phase counter will produce a square wave voltage output at a frequency of exactly 1,000 hertz. Moreover, with the arrangement shown, the transition between the two binary states will be evenly spaced in time giving an output waveform which has a one to one mark-space ratio.

In practice the clock pulse repetition rate is adjusted so that the frequency is matched to the characteristics of the filter used in the analogue electronics thereby avoiding distortion of the analogue waveforms. The output from the most significant bit of the phase counter serves three purposes:

1. To drive via single stage transitor amplifier 4 the exciting coil of one lithium niobate crystal radiation modulator 5 by signal $\phi_1$.
2. To serve in conjunction with seven other less significant outputs from the counter. Each of these outputs is split into two, one of each going direct to terminal bank A, and the other going to an inverting gate which provides an output which is the logical inverse of the input signals to the gates (i.e. if the input is logical 1, the output is logical 0, but if the input is logical 0 the output is logical 1). Thus the eight most significant output signals from the phase counter and the inverse of these are available at terminal bank A. These are fed by means of wire links arranged between terminal bank A and terminal bank B, which terminals are connected to the phasing gates 9 comprising two 8 input NAND gates and a memory circuit. The eight most significant bits and their inverse signals are fed to the inputs of the two NAND gates each of which produces a binary 0 output when, and only when, each of its eight inputs carried a binary 1 signal, otherwise the output is a binary 1. Each NAND gate is therefore able to detect an unique assembly of binary signals present in the eight most significant bit outputs of the phase counter. By suitable linking of the outputs of the phase counter (terminal bank A) to the inputs of the eight input NAND gates (terminal bank B) it is possible to obtain, at the outputs of the two NAND gates, evenly spaced transitions between the binary signal levels at the same frequency as the transitions of signal $\phi_1$ but displaced in phase from them. These transitions are used to set and reset repeatedly a memory circuit. The output, $\phi_2$, from the memory circuit is amplified by a single stage transitor amplifier 6 and used to drive the exciting coil of the second lithium niobate crystal radiation modulator. The phase difference between the signals $\phi_1$ and $\phi_2$ can be varied by varying the linkages between the output of the phase counter 2 and the eight input NAND gates (the phasing gates 9). This selection of phase difference can be performed in steps which are any integral multiple from 1 to 256 of 42.2 minutes of arc (= $180°/(2)^8$).

By varying the phase difference the sensitivity (output counts per unit change in sample beam obscuration) and linearity of the measurement are varied.

3. To initiate the production of a brief (10$\mu$ sec) pulse from a monostable circuit, 10. This pulse is used to set a memory circuit 11, which then "opens" the clock gate 3 permitting the clock pulses to reach the twelve-bit output counter 12 which begins to count these pulses. The pulse may alternatively be initiated by the NAND gate 23 (FIG. 2), or by the pulse and delay circuits 24 and 25 (FIG. 3).

Counting of clock pulses by the output counter 12 continues until the start/stop memory 11 is reset by the arrival of a pulse from the monostable 13, this pulse being initiated by the leading edge of the signal from the analogue trigger circuit. The analogue trigger circuit consists of four components; the radiation detector of the radiation analyzer 14, a detector amplifier 16, a filter unit 17 which is suitably a CR filter with a chebechev characteristic which extracts the fundamental sine wave from the complex waveform produced at the detector, and a trigger unit 18. This whole analogue trigger circuit provides a pulse with a fast rise time, related to the fundamental sine wave. The count or number held by the output counter at this time corresponds to the phase shift which it is desired to measure, plus a fixed phase delay caused by the filter network of the analogue circuits.

In addition to resetting the start/stop memory 11, the output from the monostable 13 is fed to the clock line of the twelve bit register 19 which is thereby enabled to follow the outputs of the twelve-bit counter 12 (i.e. the number held in the output counter 12 is transferred to the register 19).

The trailing edge of the pulse from the monostable 13 is used to initiate a pulse from monostable 21 by means of inverter 20, and this latter pulse is fed through inverter 22 to the twelve-bit output counter 12 in order to reset it to zero.

At this stage one complete measuring cycle has been completed and the circuits enter a quiescent period with a number held in the twelve-bit register 19. The cycle is repeated from the beginning when the next leading edge in the $\phi_1$ wave form occurs. The number held in the register 19 is therefore updated approximately 1,000 times a second. Twenty-four outputs are available from the register 19 corresponding to the output signals from the output counter 12 and the inverse of these signals. The outputs from the register can be used to drive a digital-to-analogue conversion circuit and/or a digital display (not shown). By making use of the inverse outputs from the register it is possible to compensate for the zero error caused by the fixed phase delay that is introduced by the analogue filter network.

Alternative methods of compensating for the zero error caused by the fixed phase delay are shown in FIGS. 2 and 3. In FIG. 2, instead of relying on the inverse outputs from the 12-bit register 19 to provide compensation for the zero error, the start pulse relative to the lithium niobate crystal modulator drive signal $\phi_1$ is delayed. This is suitably achieved by using an eight-input NAND gate 23 to drive the monostable 10. The phase relative to $\phi_1$, of the output signal from monostable 10 can then be set out to the required value by selecting as inputs to the NAND gate 23, the appropriate signals present at eight of the sixteen terminals in terminal bank A.

In FIG. 3 a further method of achieving the required zero correction and at the same time reducing the "noise" in the system is shown. This is suitably achieved by using the complex waveform from the detector amplifier 16 to produce a pulse signal with a short rise time. This signal generated in the pulse circuit 24, is delayed by a variable delay monostable circuit 25, which has an adjustable pulse width, and the delayed pulse is used to start monostable 10. By using the complex waveform to start, the output counter indirectly, the effects of variations in response time of the radiation detector 15 are rendered insignificant.

A suitable optical layout for the analyzer is shown by way of an example in FIG. 4. Radiation from a bare filament infra-red point source 30 is collimated in a spherical mirror collimator 31 to give a parallel beam of radiation. The single beam split into two, plane polarized beams of radiation by reflection at the Brewster angle from a pair of inclined silicon reflectors 32 and 33 which act as a beam splitter. Each beam is passed through a separate lithium niobate crystal 34 and 35 and hence to a further pair of silicon reflectors 36 and 37 arranged so that each beam of radiation is incident at the Brewster angle. Sample cells, (not shown) containing the sample under investigation and a reference material, are suitably placed in the two, parallel beams of radiation obtained by reflection at reflectors 36 and 37. The two beams are then passed via a spherical mirror condenser 38 to a single detector, suitably an indium antimonide detector. The two lithium niobate crystals are sequentially energised by means of two separate square wave alternating voltages applied at right angles to their axes of transmission and the intensity of the transmitted infra-red radiation is varied in a sequence governed by the phase difference between the two energising voltages. The second pair of polarizing devices, 36 and 37, are so orientated that the modulation of the infra-red radiation is maximised.

The signal obtained from the detector can be analyzed to give information about the sample placed in one beam in comparison with the reference material placed in the other.

By using lithium niobate crystals modulated by the square waveform alternating voltages in the radiation chopper, it is possible to make a completely solid state radiation analyzer which gives a ratio measurement, the sensitivity of which can readily be changed by changing the phase difference between the square wave form alternating voltages used to activate the chopper.

We claim:

1. A method for analysis comprising generating two separate, polarized beams of radiation, directing one of said beams through a first lithium niobate crystal and directing the other of said beams through a second lithium niobate crystal, maintaining each of said crystals at a temperature below 50°C while modulating each beam by applying out of phase, square wave form, electrical voltages to said crystals, a voltage of one phase being applied to one of said crystals and the voltage of a different phase being applied to the other of said crystals, directing said beams on a detector of said radiation to provide a complex electrical signal at the output of said detector which has a square wave form but a fundamental alternating wave form which varies in phase depending upon the relative absorption of the two beams prior to being directed on said detector, converting said fundamental wave form signal to a square wave form signal, and automatically measuring the phase shift of said fundamental wave by starting a counter at times having a predetermined time relation to one of said square wave form voltages and stopping said counter at times having a predetermined time relation to said square wave form signal.

2. A method as set forth in claim 1, wherein said counter is started by one of said square wave voltages.

3. A method as set forth in claim 1, wherein a pulse having a fixed phase relationship to one of said square wave voltages is derived from one of said square wave voltages and said counter is started by said pulse.

4. A method as set forth in claim 1, wherein a trigger signal is derived from said complex square wave form signal and said counter is started by said trigger signal.

* * * * *